US012724285B2

(12) United States Patent
Kang et al.

(10) Patent No.: US 12,724,285 B2
(45) Date of Patent: Sep. 1, 2026

(54) SPECKLE-REDUCED ILLUMINATION FOR IMPROVED SCATTERING-BASED MICROSCOPY

(71) Applicant: Arizona Board of Regents on Behalf of the University of Arizona, Tucson, AZ (US)

(72) Inventors: Dongkyun Kang, Tucson, AZ (US); Cheng Gong, Tucson, AZ (US); Christopher David Nguyen, Tucson (AZ)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 1017 days.

(21) Appl. No.: 17/906,785

(22) PCT Filed: Mar. 19, 2021

(86) PCT No.: PCT/US2021/023095
§ 371 (c)(1),
(2) Date: Sep. 20, 2022

(87) PCT Pub. No.: WO2021/188867
PCT Pub. Date: Sep. 23, 2021

(65) Prior Publication Data

US 2023/0143639 A1 May 11, 2023

Related U.S. Application Data

(60) Provisional application No. 62/992,404, filed on Mar. 20, 2020.

(51) Int. Cl.
*G02B 27/48* (2006.01)
*G02B 21/08* (2006.01)

(52) U.S. Cl.
CPC .......... *G02B 27/48* (2013.01); *G02B 21/082* (2013.01)

(58) Field of Classification Search
CPC .... G02B 27/48; G02B 5/0263; G02B 5/0257; G02B 21/06; G02B 21/08; G02B 21/082
See application file for complete search history.

(56) References Cited

U.S. PATENT DOCUMENTS 7,496,399 B2 2/2009 Maschke
8,260,401 B2 9/2012 Herrmann et al.

(Continued)

FOREIGN PATENT DOCUMENTS

CA 2774621 A1 3/2011
KR 20180015019 A * 2/2018 ............. G02B 27/30
WO 2018136818 A1 7/2018

OTHER PUBLICATIONS

Armin Gerger, et al., “Diagnostic Applicability of In Vivo Confocal Laser Scanning Microscopy in Melanocytic Skin Tumors”, J. of Investigative Dermatology, 493-498.

(Continued)

*Primary Examiner* — Ryan D Howard
(74) *Attorney, Agent, or Firm* — Perkins Coie

(57) ABSTRACT

Speckle-modulated line illumination devices and associated methods are described that enable acquisition of images with high resolution and high speed simultaneously. One example speckle-modulated line illumination device includes a spatially coherent light source having a speckled output, a collimation lens positioned to receive the output of the spatially coherent light source, a cylindrical lens positioned to receive a collimated light produced by the collimation lens, and a diffuser positioned to receive a focused line illumination from the cylindrical lens, and to impart random phase variations in light that is output therefrom. The diffuser is coupled to a movement stage to impart rotational (Continued)

or translational movements to the diffusor as a function of time. Implementations of the disclosed technology can be used to develop reflectance confocal microscopy devices and scattering-based light sheet microscopy devices.

20 Claims, 11 Drawing Sheets

(56) References Cited

U.S. PATENT DOCUMENTS

| | | | | |
|---|---|---|---|---|
| 2003/0039036 | A1* | 2/2003 | Kruschwitz .......... | H04N 9/3132 359/623 |
| 2007/0145248 | A1 | 6/2007 | Babayoff et al. | |
| 2009/0257106 | A1 | 10/2009 | Tan et al. | |
| 2018/0180867 | A1* | 6/2018 | Shimada .............. | G02B 21/025 |
| 2019/0227336 | A1 | 7/2019 | Parrett et al. | |

OTHER PUBLICATIONS

Arora M, Cutler CS, Jagasia MH, Pidala J, Chai X, Martin PJ, et al. Late Acute and Chronic Graft-versus-Host Disease after Allogeneic Hematopoietic Cell Transplantation. Biol Blood Marrow Transplant 2016;22:449-55.
Asaduzzaman M, Mihaescu A, Wang Y, Sato T, Thorlacius H. P-selectin and P-selectin glycoprotein ligand 1 mediate rolling of activated CD8+ T cells in inflamed colonic venules. J Investig Med 2009;57:765-8.
Broder MS, Quock TP, Chang E, Reddy SR, Agarwal-Hashmi R, Arai S, et al. The cost of hematopoietic stem-cell transplantation in the United States. Am Heal Drug Benefits 2017;10:366-79.
Castor MGM, et al. The CCL3/Macrophage Inflammatory Protein-1a-Binding Protein Evasin-1 Protects from Graft-versus-Host Disease but Does Not Modify Graft-versus-Leukemia in Mice. J Immunol 2010; 184:2646-54.
Celi A, et al. Thrombus formation: Direct real-time observation and digital analysis of thrombus assembly in a living mouse by confocal and widefield intravital micro scopy. J Thromb Haemost 2003;1:60-8.
Couriel D, Caldera H, Champlin R, Komanduri K. Acute Graft-versus-Host Disease: Pathophysiology, Clinical Manifestations, and Management. Cancer 2004; 101:1936-46. https://doi.org/10.1002/cncr.20613.
D.J. Kadouch, et al., "Diagnostic Accuracy of Confocal Microscopy Imaging vs. Punch Biopsy for Diagnosing and Subtyping basal cell carcinoma," J. of the European Academy of Dermatology and Venererlogy, 2017.
Dumler JS, Beschorner WE, Farmer ER, Di Gennaro KA, Saral R, Santos GW. Endothelial-cell injury in cutaneous acute graft-versus-host disease. Am J Pathol 1989; 135:1097-103.
Esther E. Freeman, et al., "Smartphone Confocal Microscopy for Imaging Cellular Structures in Human Skin in vivo," Biomedical Optics Express vol. 9, No. 4, 2018.
Firoz BF, Lee SJ, Nghiem P, Qureshi AA. Role of Skin Biopsy to Confirm Suspected Acute Graft-vs-Host Disease. Arch Dermatol 2006; 142:175-82. https://doi.org/10.1001/archderm.142.2.175.
Germain RN, Miller MJ, Dustin ML, Nussenzweig MC. Dynamic imaging of the immune system: progress, pitfalls and promise. Nat Rev Immunol 2006;6:497-507. https://doi.org/10.1038/nri1884.
Gittens BR, Bodkin JV., Nourshargh S, Perretti M, Cooper D. Galectin-3: A Positive Regulator of Leukocyte Recruitment in the Inflamed Microcirculation. J Immunol 2017; 198:4458-69. https://doi.org/10.4049/jimmunol.1600709.
Glazowski C, Rajadhyaksha M. Optimal detection pinhole for lowering speckle noise while maintaining adequate optical sectioning in confocal reflectance microscopes. J Biomed Opt 2012;17:85001.
Gratwohl A, et al. Cause of death after allogeneic haematopoietic stem cell transplantation (HSCT) in early leukaemias: An EBMT analysis of lethal infectious complications and changes over calendar time. Bone Marrow Transplant 2005;36:757-69.
Harlan JM. Leukocyte-endothelial interactions. Blood 1985;65:513 LP-525.
Harris AC, et al. International, multicenter standardization of acute graft-versus-host disease clinical data collection: a report from the Mount Sinai Acute GVHD International Consortium. Biol Blood Marrow Transplant 2016;22:4-10.
International Search Report and Written Opinion mailed Jul. 28, 2021 for International Patent Application No. PCT/US2021/023095 (17 pages).
Jacobsohn DA, Vogelsang GB. Acute graft versus host disease. Orphanet J Rare Dis 2007;2:1-9. https://doi.org/10.1186/1750-1172-2-35.
Janssen GH, Tangelder GJ, Oude Egbrink MG, Reneman RS. Spontaneous leukocyte rolling in venules in untraumatized skin of conscious and anesthetized animals. Am J Physiol 1994;267:H1199-204.
Jung U, Bullard DC, Tedder TF, Ley K. Velocity differences between L- and P-selectin-dependent neutrophil rolling in venules of mouse cremaster muscle in vivo. Am J Physiol 1996;271:H2740-7.
Kasazumi K, Kitaoka Y, Mizuuchi K, Yamamoto K. A Practical Laser Projector with New Illumination Optics for Reduction of Speckle Noise. Jpn J Appl Phys 2004; 43:5904-6.
Kim J, Kang D, Gweon D. Spectrally encoded slit confocal microscopy. Opt Lett 2006;31:1687-89. https://doi.org/10.1364/OL.31.001687.
Kuykendall TD, Smoller BR. Lack of specificity in skin biopsy specimens to assess for acute graft-versus-host disease in initial 3 weeks after bone-marrow transplantation. J Am Acad Dermatol 2003;49:1081-5. https://doi.org/10.1016/S0190-9622(03)02098-X.
Ley K, Bullard DC, Arbones ML, Bosse R, Vestweber D, Tedder TF, et al. Sequential contribution of L- and P-selectin to leukocyte rolling in vivo. J Exp Med 1995;181:669-75. https://doi.org/10.1084/jem.181.2.669.
Ley K, Kansas GS. Selectins in T-cell recruitment to non-lymphoid tissues and sites of inflammation. Nat Rev Immunol 2004;4:325-36. https://doi.org/10.1038/nri1351.
Li C, Pastila RK, Pitsillides C, Runnels JM, Puoris'haag M, Côté D, et al. Imaging leukocyte trafficking in vivo with two-photon-excited endogenous tryptophan fluorescence. Opt Express 2010;18:988-99. https://doi.org/10.1364/OE.18.000988.
Liba O, Lew MD, SoRelle ED, Dutta R, Sen D, Moshfeghi DM, et al. Speckle-modulating optical coherence tomography in living mice and humans. Nat Commun 2017;8:15845.
MacMillan ML, et al. A refined risk score for acute graft-versus-host disease that predicts response to initial therapy, survival, and transplant-related mortality. Biol Blood Marrow Transplant 2015;21:761-7.
Mempel TR, Scimone ML, Mora JR, Von Andrian UH. In vivo imaging of leukocyte trafficking in blood vessels and tissues. Curr Opin Immunol 2004; 16:406-17. https://doi.org/10.1016/j.coi.2004.05.018.
Nash RA, Pepe MS, Storb R, Longton G, Pettinger M, Anasetti C, et al. Acute graft-versus-host disease: analysis of risk factors after allogeneic marrow transplantation and prophylaxis with cyclosporine and methotrexate. Blood 1992; 80:1838-45.
Pan J-W, Shih C-H. Speckle reduction and maintaining contrast in a LASER pico-projector using a vibrating symmetric diffuser. Opt Express 2014;22:6464-77. https://doi.org/10.1364/OE.22.006464.
Parnaby-Price A, et al. Leukocyte trafficking in experimental autoimmune uveitis in vivo, J. Leukocyte Biology, 1998;64:434-40.
Saber W, Opie S, Rizzo JD, Zhang M-J, Horowitz MM, Schriber J. Outcomes after matched unrelated donor versus identical sibling hematopoietic cell transplantation in adults with acute myelogenous leukemia. CME article 2012; 119:3908-16.
Sackstein R. A Revision of Billingham's Tenets : The Central Role of Lymphocyte Migration in Acute Graft-versus-Host Disease. Biol Blood Marrow Transplant 2006; 12:2-8. https://doi.org/10.1016/j.bbmt.2005.09.015.

(56) References Cited

OTHER PUBLICATIONS

Socié G, Niederwieser D, von Bubnoff N, Szer J, Mohty M, Laughlin M, et al. Reach-2 Trial Design: Biol Blood Marrow Transplant 2018;24: S203. https://doi.org/10.1016/j.bbmt.2017.12.167.

Socie G, Ritz J. Current issues in chronic graft-versus-host disease. Adv Hematop Cell Transplant 2014; 124:374-84.

Suh E-J, Woo Y-A, Kim H-J. Determination of water content in skin by using a FT near infrared spectrometer. Arch Pharm Res 2005;28:458-62. https://doi.org/10.1007/BF02977676.

Tsai C-K, Chen Y-S, Wu P-C, Hsieh T-Y, Liu H-W, Yeh C-Y, et al. Imaging granularity of leukocytes with third harmonic generation microscopy. Biomed Opt Express 2012;3:2234-43. https://doi.org/10.1038/srep37210.

Varelias A, Ormerod KL, Bunting MD, Koyama M, Gartlan KH, Kuns RD, et al. Acute graft- versus-host disease is regulated by an IL-17-sensitive microbiome. Blood 2017; 129:2172-85. https://doi.org/10.1182/blood-2016-08-732628.

Villani E, Baudouin C, Efron N, Hamrah P, Kojima T, Patel SV, et al. In vivo confocal microscopy of the ocular surface: from bench to bedside. Curr Eye Res 2014;39:213-31. https://doi.org/10.3109/02713683.2013.842592.

Wang X, Fujita M, Prado R, Tousson A, Hsu HC, Schottelius A, et al. Visualizing CD4 T-cell migration into inflamed skin and its inhibition by CCR4/CCR10 blockades using in vivo imaging model. Br J Dermatol 2010; 162:487-96.

Weisdorf D, Hakke R, Blazar B, Miller W, McGlave P, Ramsay N, et al. Risk factors for acute graft-versus-host disease in histocompatible donor bone marrow transplantation. Transplantation 1991;51:1197-203.

Zhou Y, Barnett MJ, Rivers JK. Clinical significance of skin biopsies in the diagnosis and management of graft-vs-host disease in early postallogeneic bone marrow transplantation. Arch Dermatol 2000;136:717-21. https://doi.org/10.1001/archderm. 136.6.717.

Leveson-Gower, "", Leveson-Gower DB, Negrin Rs. CH 4 —In vivo imaging of graft-versus-host disease and graft-versus-leukemia. In: Socié G, Blazar BR, editors. Immune Biol. Allogeneic Hematop. Stem Cell Transplant. San Diego: Academic Press; 2013. p. 59-81.

* cited by examiner

Speckle pattern on the pinhole plane

Optimal pinhole size for good axial resolution

Wider pinhole size for speckle reduction

SPECKLE-REDUCED ILLUMINATION FOR IMPROVED SCATTERING-BASED MICROSCOPY

CROSS REFERENCE TO RELATED APPLICATIONS

This patent document is a 371 National Phase Application of International Patent Application No. PCT/US2021/023095, filed Mar. 19, 2021, which claims priority to the provisional application with Ser. No. 62/992,404, titled "SPECKLE-REDUCED ILLUMINATION FOR IMPROVED SCATTERING-BASED MICROSCOPY," filed Mar. 20, 2020. The entire contents of the above noted applications are incorporated by reference as part of the disclosure of this document.

TECHNICAL FIELD

The disclosed embodiments relate to illumination devices and in particular illumination devices that produce reduced speckle that are suitable for use in microscopy systems.

BACKGROUND

Scattering-based microscopy technologies, such as reflectance confocal microscopy (RCM) and optical coherence tomography (OCT), are promising techniques for diagnosing various human diseases non-invasively. Certain cellular structures generate scattered light signals due to the relative difference in their refractive index compared to the surrounding cellular structures. Since intrinsic contrast of the tissue is used rather than the contrast from exogenous agents, scattering-based microscopy technologies can visualize cellular morphologic changes associated with certain diseases without having to remove the tissue.

Most of the scattering-based microscopy technologies use a coherent light source due to its capability of tight focusing with high power density. Use of the coherent light source, however, generates severe speckle noise in acquired images. The speckle noise makes it challenging to interpret cellular features.

SUMMARY

The disclosed embodiments, among other features and benefits, enable new scattering-based microscope designs that use a speckle-modulated line illumination unit, and enable acquisition of images with high resolution and high speed simultaneously. Among other features and benefits, implementations of the disclosed technology can be used to develop reflectance confocal microscopy devices and scattering-based light sheet microscopy devices to image the human tissue in vivo or ex vivo and provide diagnostic information for various human diseases.

One example speckle-modulated line illumination device includes a spatially coherent light source having a speckled output, a collimation lens positioned to receive the output of the spatially coherent light source, a cylindrical lens positioned to receive a collimated light produced by the collimation lens, and a diffuser positioned to receive a focused line illumination from the cylindrical lens, and to impart random phase variations in light that is output therefrom. The diffuser is coupled to a movement stage configured to impart rotational or translational movements to the diffusor as a function of time.

DETAILED DESCRIPTION

Figure 1:
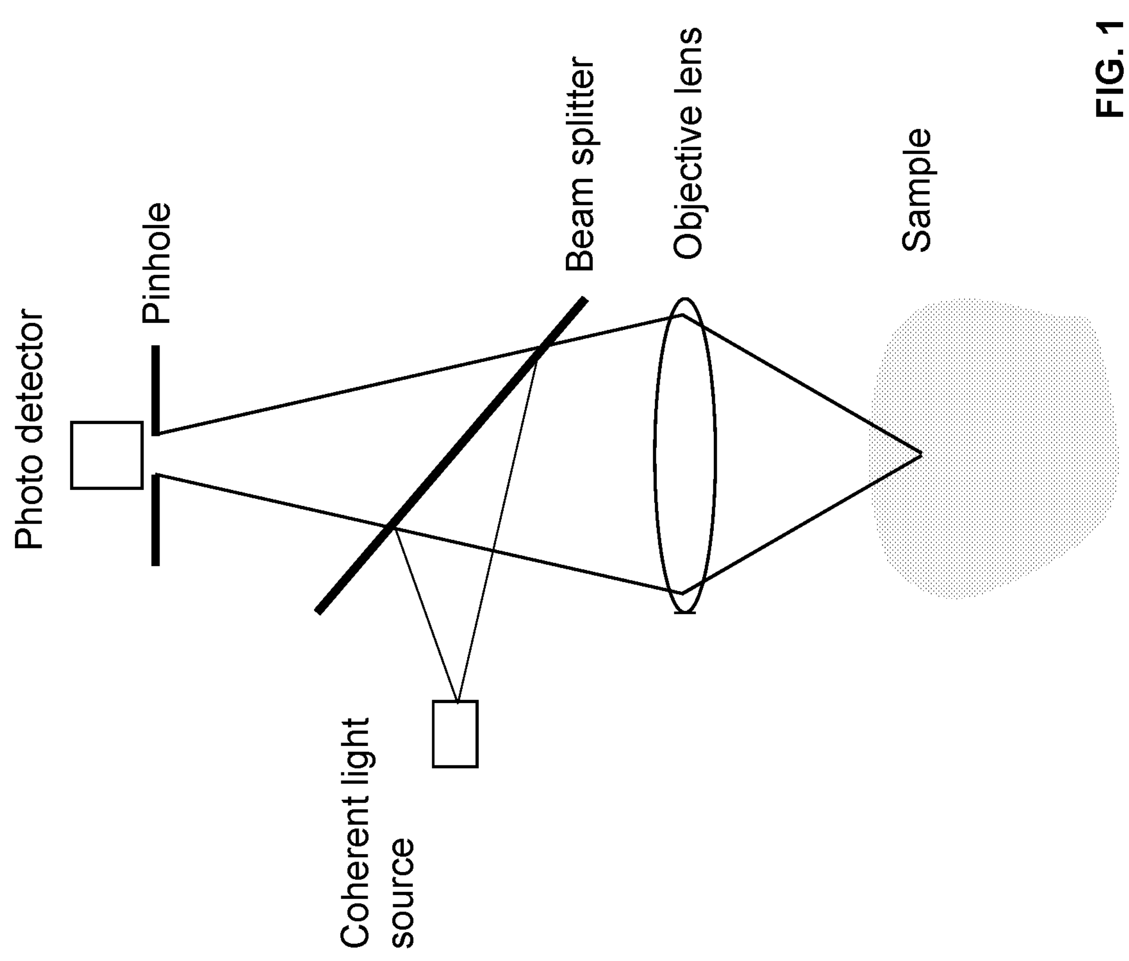
FIG. 1 illustrates a reflectance confocal microscopy (RCM) device and an associated speckle pattern.

In reflectance confocal microscopy (RCM) devices, wide detection apertures were used to reduce the speckle noise, as illustrated in FIG. 1. In this diagram, light from a coherent light source is directed to the sample by a beam splitter; the light received from the sample passes through a pinhole and is received by the photo detector. Using this approach, photons from multiple speckle patterns are detected together to generate the intensity value for the given imaging point. While this approach significantly reduced the speckle noise, it also had several shortcomings; for example, the relatively wide aperture degrades the axial resolution and the residual speckle noise poses challenges in the image interpretation in certain cases. The right-hand side in FIG. 1 shows an example of the speckle pattern at the pinhole plane, and illustrates different pinhole sizes that would produce desired speckle reduction and good axial resolution, respectively. In particular, the central section illustrates the optimal pinhole size for obtaining good axial resolution, while the outer section illustrates the wider pinhole size to reduce the speckle.

Figure 2:
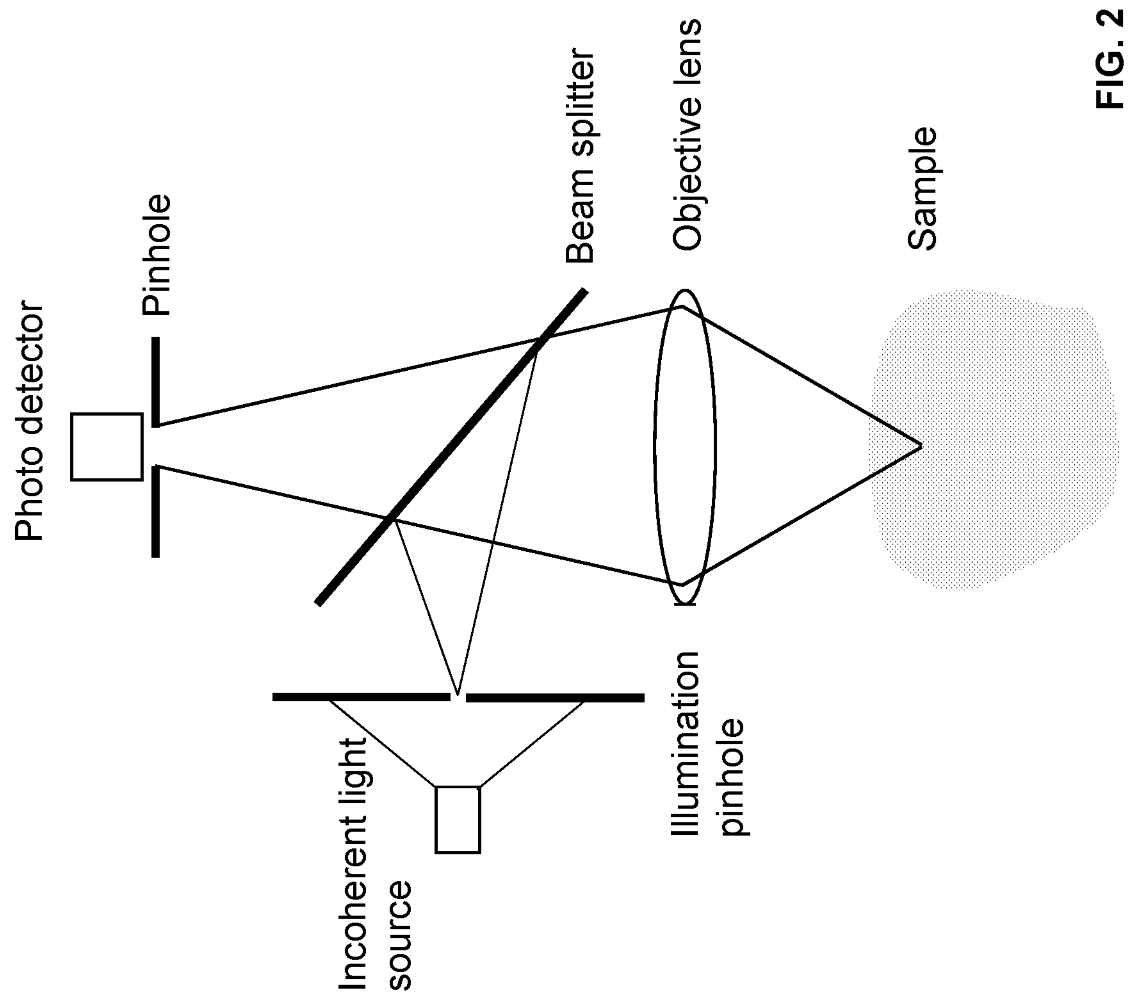
FIG. 2 illustrates another RCM device that uses incoherent light source.

Another method for reducing the speckle noise in RCM images is to use an incoherent light source such as a light-emitting diode (LED), as illustrated using the configuration of FIG. 2. In this configuration, light from the incoherent light source is filtered by an illumination pinhole. The light after the illumination pinhole makes a tightly confined illumination on the spot on the sample. Thanks to the use of the incoherent light source, the detection pinhole does not have to have a wider opening and therefore can maintain good axial resolution. The speckle noise can be reduced significantly, beyond the level that is achievable with the approach of using a coherent light source and wider pinhole. However, the coupling efficiency between the incoherent light source and illumination pinhole is very low, which reduces the illumination light intensity. This reduces the imaging speed and makes the device prone to having image degradation due to the motion blur.

Figure 3:
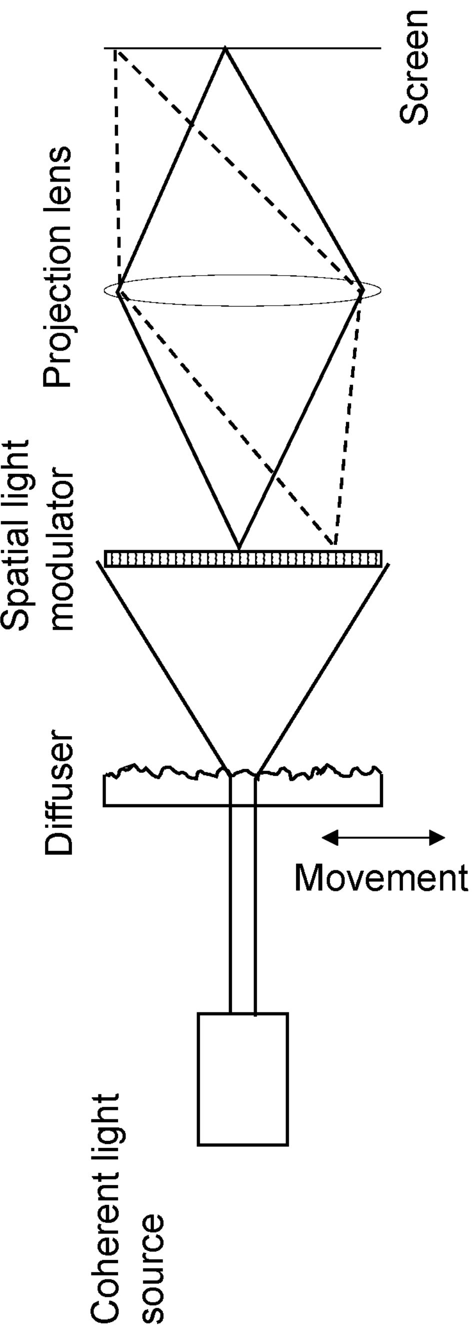
FIG. 3 illustrates a projector configuration that utilizes a diffuser-based speckle reduction technique.

Diffuser-based speckle reduction method has been used for laser-based projectors, as illustrated using the configuration of FIG. 3. In this configuration, collimated light from a coherent light is scattered by the diffuser and illuminates the spatial light modulator. The illumination pattern on the spatial light modulator has speckles. Light is filtered by the spatial light modulator and is imaged on the screen using the projection lens. The image projected on the screen also exhibits speckle patterns. By moving the diffuser rapidly, faster than the update rate of the spatial light modulator, multiple independent speckle patterns are used for the projection and reduce the perceived speckle noise. This method, however, is not directly useable for microscopic imaging, since light scattered by the diffuser is diverging and no longer can be used as a collimated beam.

In a previous optical coherence tomography (OCT) research, a moving diffuser has been used in the intermediate image plane to reduce the speckle noise. In this approach, light from a coherent light source is focused to a spot on the diffuser, where random phase variation is introduced. The light from the diffuser is further focused on the tissue to conduct OCT imaging. An OCT image is obtained at a given, stationary position of the diffuser. Then the next OCT image of the same sample location is obtained after moving the diffuser to a new location. This process is repeated to acquire multiple OCT images with independent speckle patterns. The multiple OCT images are combined to generate the final OCT image with the reduced speckle noise. While this approach reduces the speckle noise in OCT images, the method, among other shortcomings, requires acquisition of multiple images, which reduces the effective imaging speed.

The disclosed embodiments overcome the above shortcomings and produce high resolution images in scattering-based microscopy devices at high speeds, with reduced speckle. These, and other features and benefits, are achieved at least in-part by utilizing a speckle-modulated line illumination unit. Unlike previous RCM approaches of reducing speckle noise, the disclosed embodiments can achieve high axial resolution and high imaging speed simultaneously. And, unlike the previous approaches of reducing the speckle noise, each image acquired in accordance with the example embodiments has significantly-reduced speckle noise, which obviates the need for acquisition of multiple images.

Figure 4:
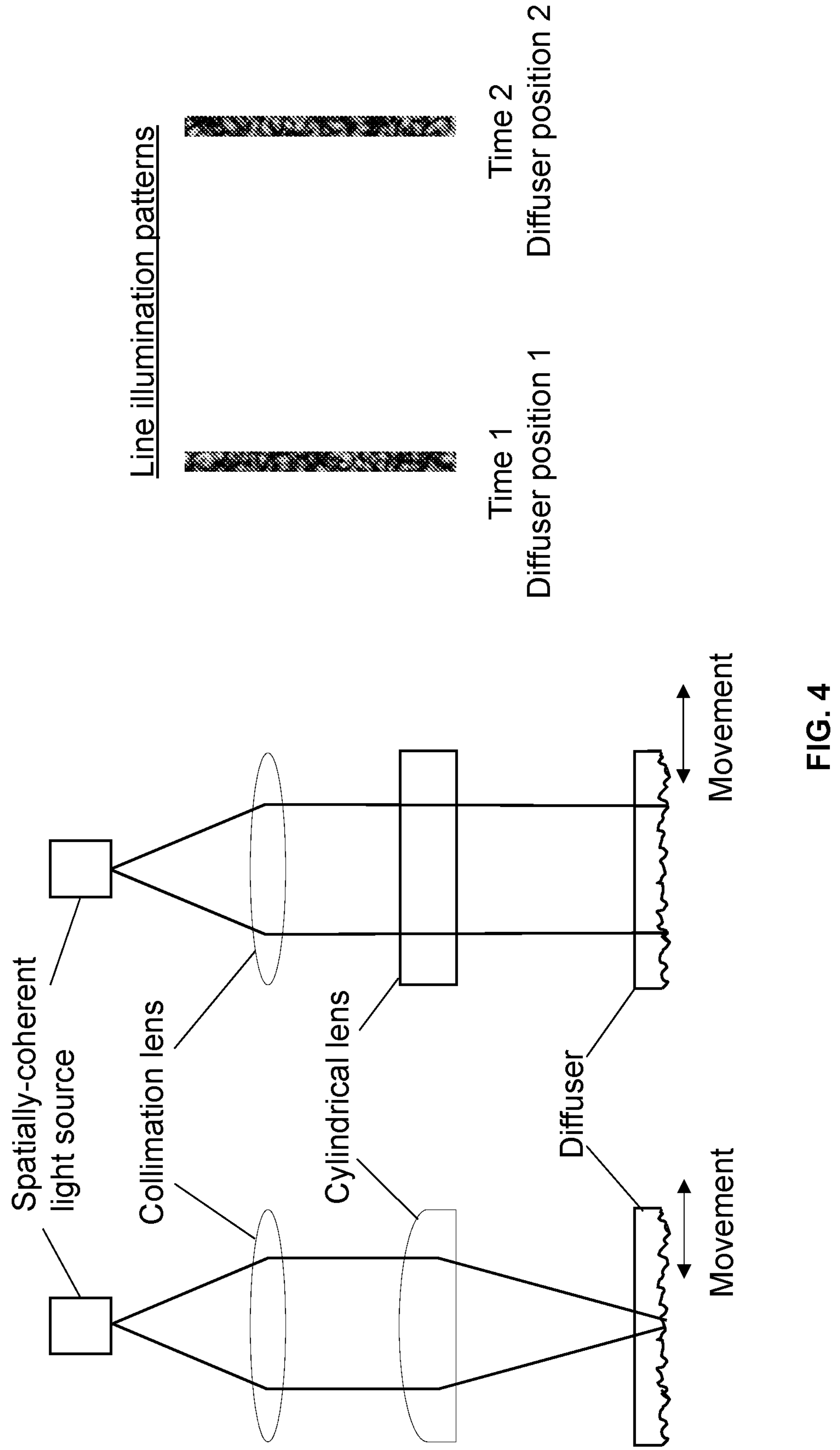
FIG. 4 illustrates front and side views of a speckle-modulated line illumination unit in accordance with an example embodiment.

An example embodiment of the speckle-modulated line illumination unit is illustrated in FIG. 4. In FIG. 4, both a front view and a side view of the illumination unit are presented. Light from a spatially-coherent light source (e.g., a laser diode, a super luminescent light emitting diode (sLED)) is collimated by an axially-symmetric collimation lens into a circular beam. The collimated beam is focused into a line by a cylindrical lens. The line illumination is scattered by a diffuser. The diffuser can, for example, be a glass diffuser with random variations in its surface profile to impart random variations in the phase of the light that is transmitted therethrough. The diffuser generates a random phase variation within the focused line. The random phase variation generates a speckle pattern within the tightly-focused line. As the diffuser moves, either through translation or rotation, the random phase variation within the focused line changes. Therefore, the movement of the diffuser changes the speckle pattern within the line. The result is a tightly focused line that does not change its position but has a time-varying speckle pattern. The right-hand side of FIG. 4 illustrates two example line illumination patterns that are produced at Time 1 (corresponding to diffuser position 1) and Time 2 (corresponding to diffuser position 2). It should be noted that while FIG. 4 illustrates a diffuser that transmits the light therethrough, it some implementations, the diffuser may be configured to impart random variations in the reflected light.

Figure 5:
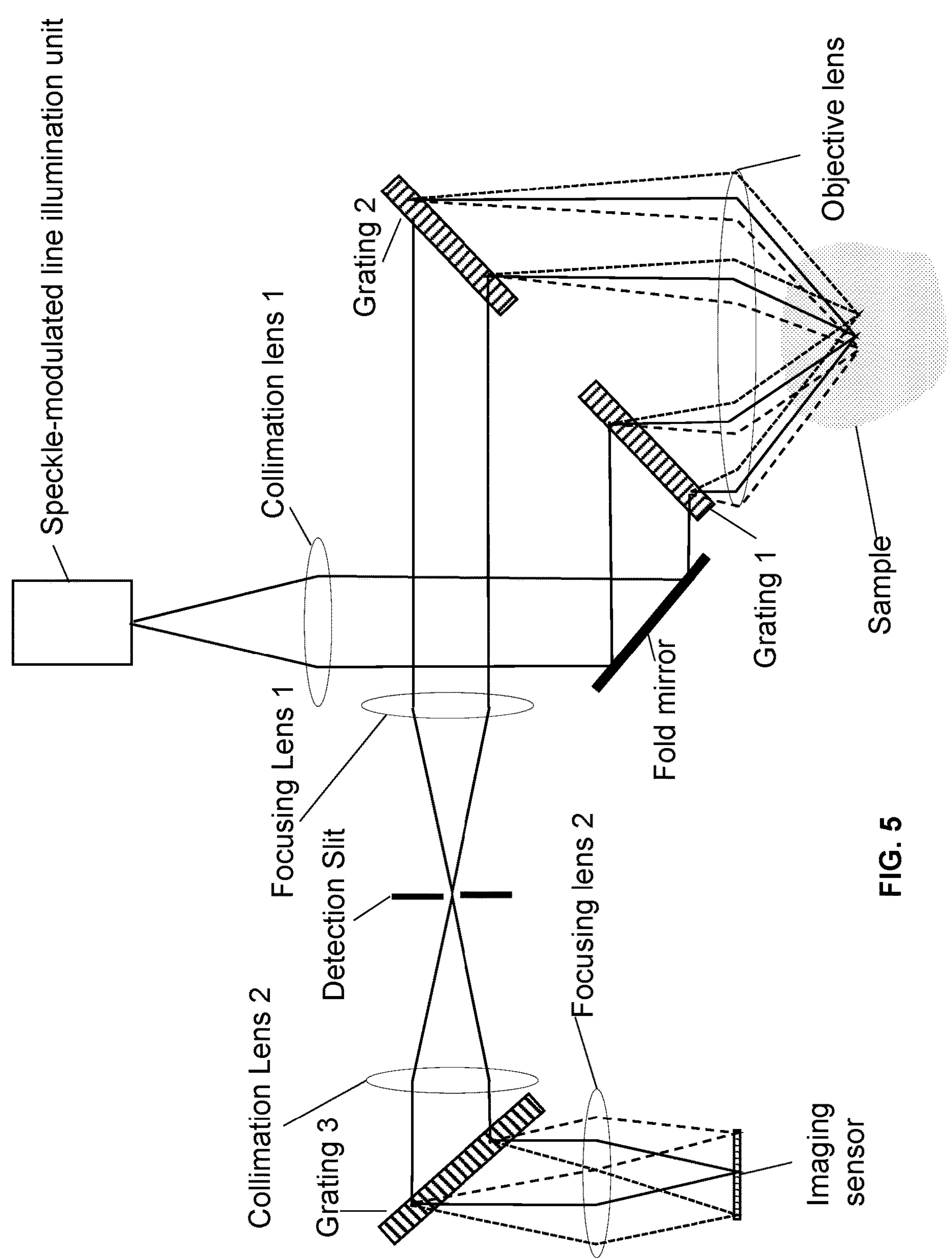
FIG. 5 illustrates a speckle-modulated line illumination unit implemented with a spectrally-encoded confocal microscope in accordance with an example embodiment.

FIG. 5 illustrates an example embodiment in which a speckle-modulated line illumination unit is used in conjunction with a spectrally-encoded confocal microscope (a type of RCM). Light from the speckle-modulated line illumination unit (e.g., produced by a configuration similar to the one shown in FIG. 4) is collimated by collimation lens 1 and reflected by the fold mirror. The collimated light is diffracted by grating 1 and focused by the objective lens onto the sample. Each wavelength of the light (as exemplified by the solid, and two variations of dashed lines) is focused into a line on the sample. In particular, different wavelengths are focused into different locations along a transverse axis of the sample plane, which provides the one-to-one relationship between the wavelength and the sample coordinate. Light reflected back from the sample is collected by the objective lens and is received by grating 2. Grating 2 accepts different wavelengths with different incidence angles and directs all the wavelengths into a single propagation angle. The light after grating 2 is focused by a focusing lens 1 onto a detection slit. At the detection slit, light reflected from a sample location that is out of the focal plane is mostly rejected. Therefore, contribution of the reflected light from the in-focus features is mainly preserved, achieving optical sectioning capability. Light after the detection slit is collimated by collimation lens 2, diffracted by grating 3, and focused by focusing lens 2 onto an imaging sensor. A two-dimensional confocal image is directly formed on the imaging sensor.

In operation, at a given time point, a particular speckle pattern is generated within the focused line from the speckle-modulated line illumination unit. Therefore, the illumination pattern on the sample also has a particular speckle pattern and the confocal image obtained at this time point has a speckle noise. Then the speckle pattern from the speckle-modulated line illumination unit is changed by the diffuser movement or other means, which changes the speckle noise pattern present in the confocal image. If the speckle modulation speed of the speckle-modulated line illumination unit is set in such a way that the imaging sensor is exposed to N independent speckle illumination patterns (N is greater than or equal to 2), then the speckle noise contrast on the image is decreased to $1/\sqrt{N}$. For example, 16 different speckle patterns produced in a one-second interval, reduce the output speckle noise by 25%. Thus, N (greater than or equal to 2) can be selected to reduce the noise associated with a speckle present in the output of the diffuser relative to the output of the spatially coherent light source by a predetermined amount.

Figure 6:
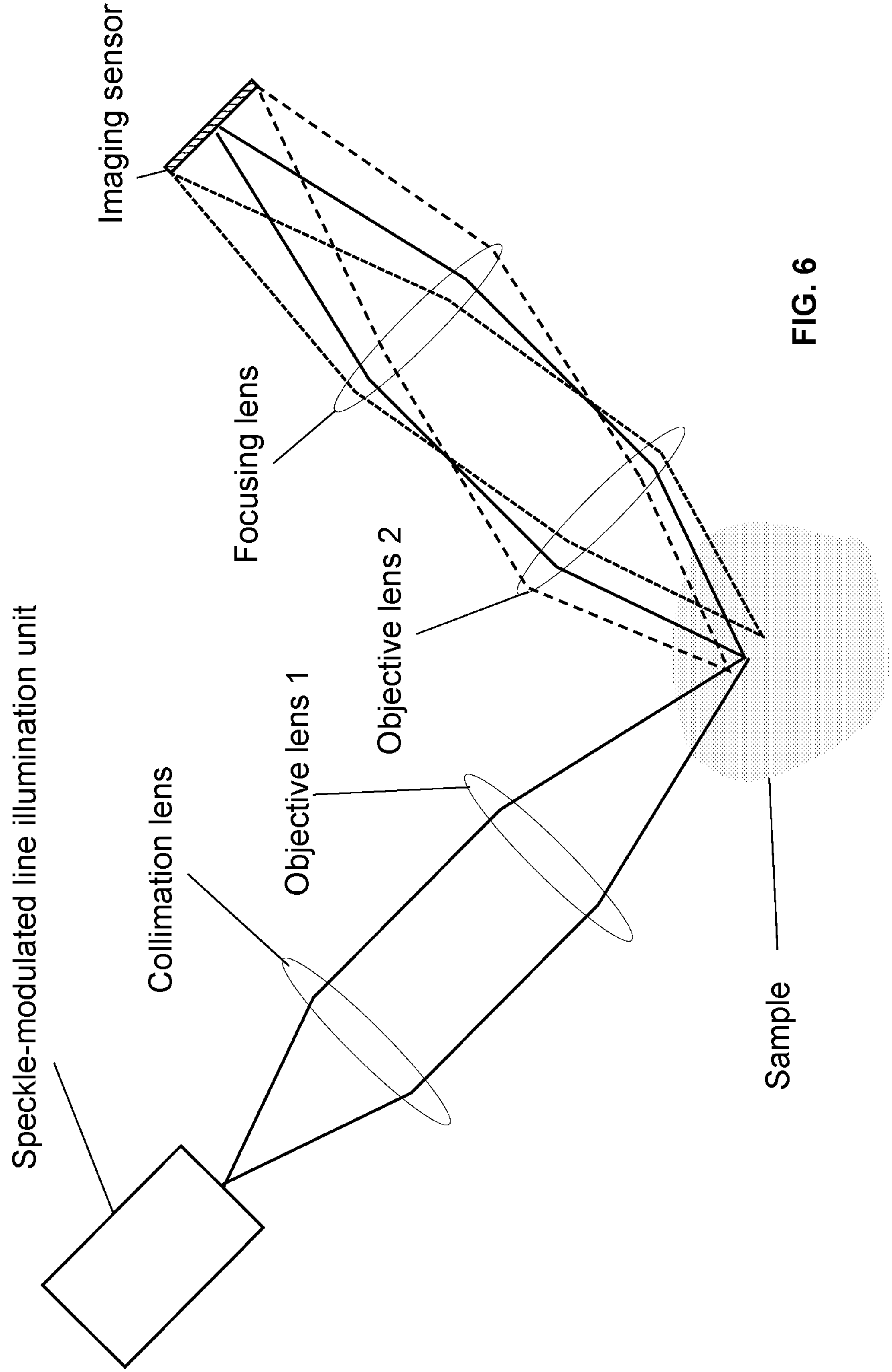
FIG. 6 illustrates a speckle-modulated line illumination unit implemented with a scattering-based light sheet microscopy device in accordance with an example embodiment.

FIG. 6 illustrates another embodiment in which the speckle-modulated line illumination unit can be used in conjunction with a scattering-based light sheet microscopy. Line illumination from the speckle-modulated line illumination unit (e.g., produced by a configuration similar to the one shown in FIG. 4) is collimated by the collimation lens and focused on the sample by objective lens 1. Light scattered by the sample is collected by objective lens 2 and focused by the focusing lens onto an imaging sensor that produces two-dimensional images of the sample. In FIG. 6, different reflected lights (exemplified by dashed and solid lines) correspond to lights reflected from different points on the object. The imaging sensor is conjugate to a two-dimensional plane on the sample. That conjugate plane coincides with the optical axis of the illumination optics. If the speckle modulation speed of the speckle-modulated line illumination unit is set in such a way that the imaging sensor is exposed to N independent speckle illumination patterns, then the speckle noise contrast on the image is decreased to $1/\sqrt{N}$. The configuration in FIG. 6 is not a confocal microscope and does not produce spectrally separated illumination onto the sample (compare to FIG. 5), thus illustrating the versatility of the disclosed speckle-modulated line illumination unit for use in different microscopy devices.

Figure 7:
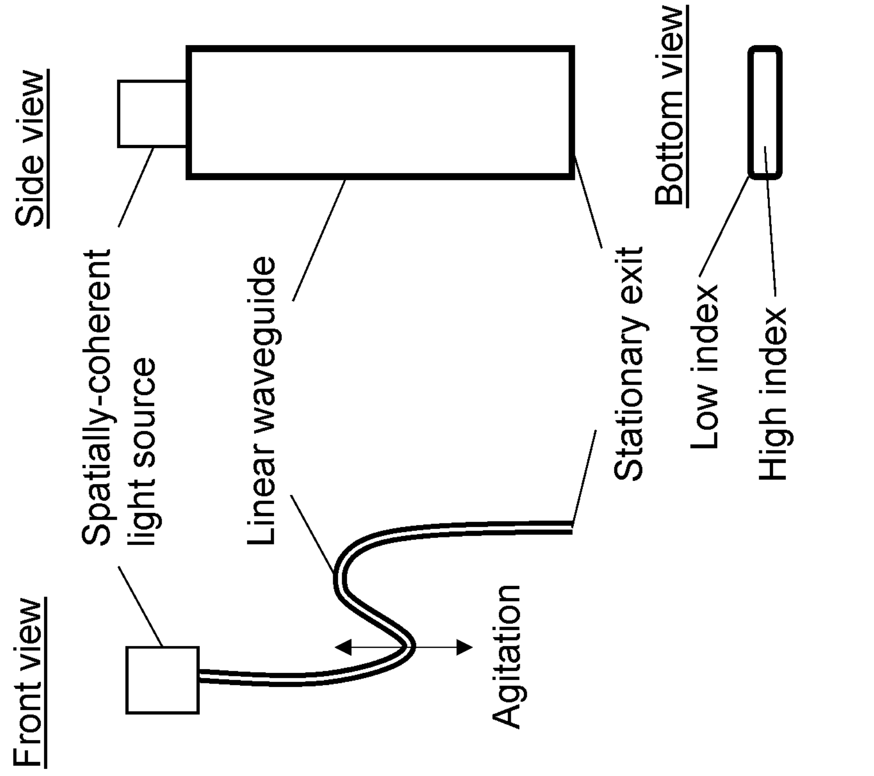
FIG. 7 illustrates a speckle-modulated line illumination unit in accordance with another example embodiment.

FIG. 7 illustrates a speckle-modulated line illumination unit in accordance with another example embodiment. The speckle-modulated line illumination unit of FIG. 7 can be used with, for example, the microscope configurations of FIGS. 4 and 5. In FIG. 7, a front view, a side view and a bottom view of the illumination unit are presented. Light from a spatially-coherent light source (e.g. a laser diode, a super luminescent light emitting diode (sLED)) is coupled into a flexible linearwaveguide. The linear waveguide can be manufactured with a flexible, transparent material (e.g., PDMS, PMMA) shaped into a narrow rectangle profile and coated with a lower index flexible material. The beam at the exit of the linear waveguide is confined to a thin line due to the profile of the linear waveguide. That is, the ratio of the length to width of the bottom-view rectangular cross-sectional area is selected to be very high. In one example, the rectangular area has dimensions of 3 mm by 25 μm. The exit beam has a random speckle pattern due to multiple modes that can propagate through the linearwaveguide. The speckle pattern is varied temporally by agitating the linearwaveguide. Accordingly, the speckle pattern of the exit beam can be varied as a function of time similar to the beam produced using the configuration of FIG. 4. Using the configuration of FIG. 7, a relatively cheap and light-weight implementation of the line illumination unit can be achieved.

Figure 8:
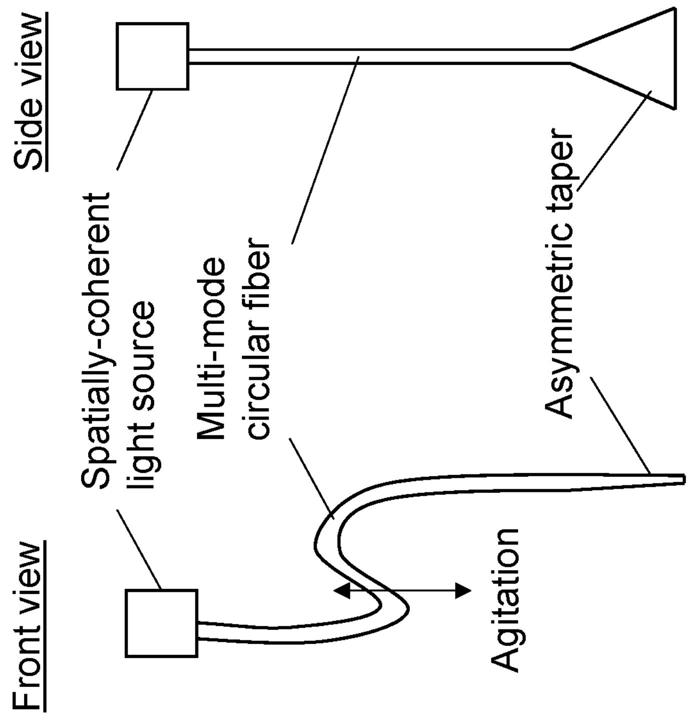
FIG. 8 illustrated another speckle-modulated line illumination unit in accordance with an example embodiment.

FIG. 8 illustrated another speckle-modulated line illumination unit in accordance with an example embodiment. The speckle-modulated line illumination unit of FIG. 8 can be used with, for example, the microscope configurations of FIGS. 4 and 5. In FIG. 8, a front view and a side view of the illumination unit are presented. In this configuration, light from a spatially-coherent light source (e.g. a laser diode, a super luminescent light emitting diode (sLED)) is coupled into a multi-mode circular fiber. The circular fiber is asymmetrically tapered at the distal end so that the exit profile of the tapered region becomes a thin rectangle. The exit beam has a random speckle pattern due to multiple modes that can propagate through the multi-mode circular fiber. The speckle pattern is varied temporally by agitating the multi-mode circular fiber. Accordingly, the speckle pattern of the exit beam can be varied as a function of time similar to the beam produced using the configuration of FIGS. 4 and 7. Using this configuration, an even cheaper and lighter-weight implementation of the line illumination unit can be achieved compared due to the use of fibers.

Figure 9:
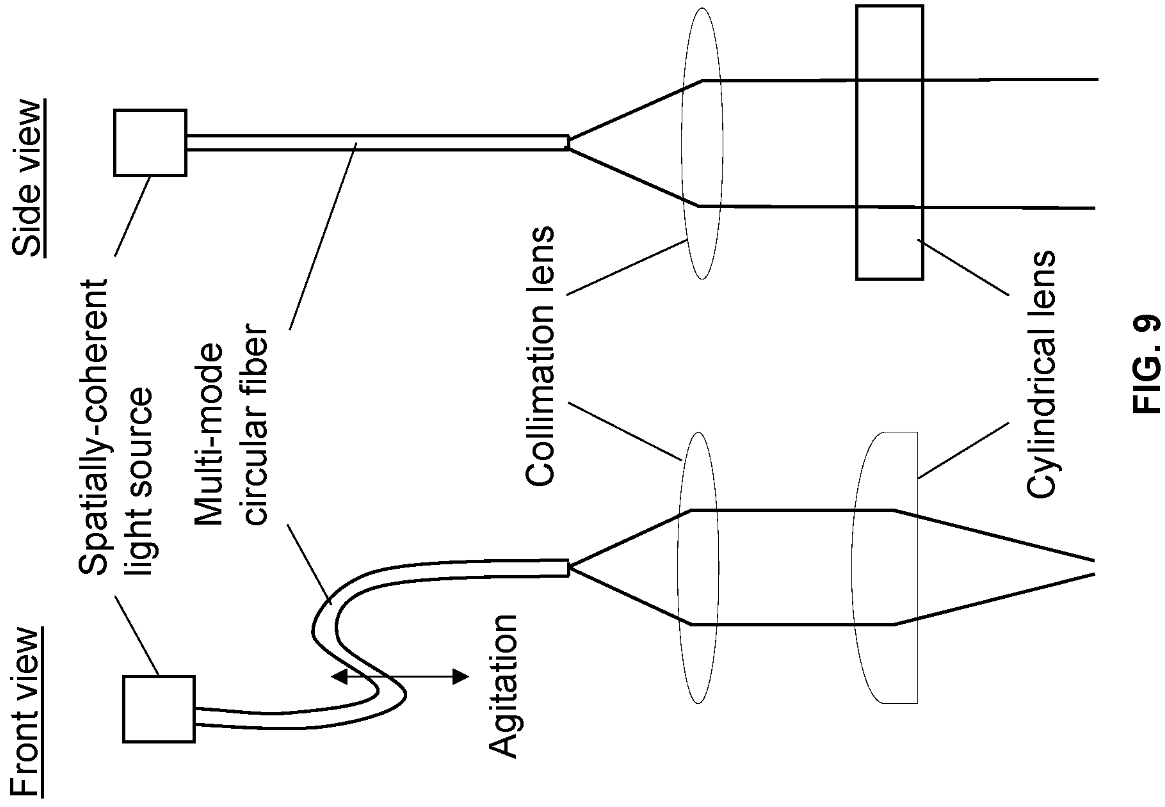
FIG. 9 illustrates a speckle-modulated line illumination in accordance with another example embodiment.

FIG. 9 illustrates a speckle-modulated line illumination in accordance with another example embodiment. The speckle-modulated line illumination unit of FIG. 9 can be used with, for example, the microscope configurations of FIGS. 4 and 5. In FIG. 9, a front view and a side view of the illumination unit are presented. In this configuration, light from a spatially-coherent light source (e.g. a laser diode, a super luminescent light emitting diode (sLED)) is coupled into a multi-mode circular fiber. The light from the circular fiber is collimated by a collimation lens and focused by a cylindrical lens into a thin line. The exit beam has a random speckle pattern due to multiple modes that can propagate through the multi-mode circular fiber. The speckle pattern is varied temporally by agitating the multi-mode circular fiber. Accordingly, the speckle pattern of the exit beam can be varied as a function of time similar to the beam produced using the configuration of FIGS. 4, 7 and 8. Compared to FIG. 8, the configuration in FIG. 9 does not require tapering of the circular fiber and thus allows the use of standard components.

It is thus evident that disclosed embodiments advantageously reduce the speckle noise that is commonly present in scattering-based tissue microscopy technologies. By generating a tightly focused line illumination with temporally-varying speckle patterns, the disclosed technology can significantly reduce the speckle noise in microcopy images and facilitate the analysis of cellular features visualized.

Figure 10:
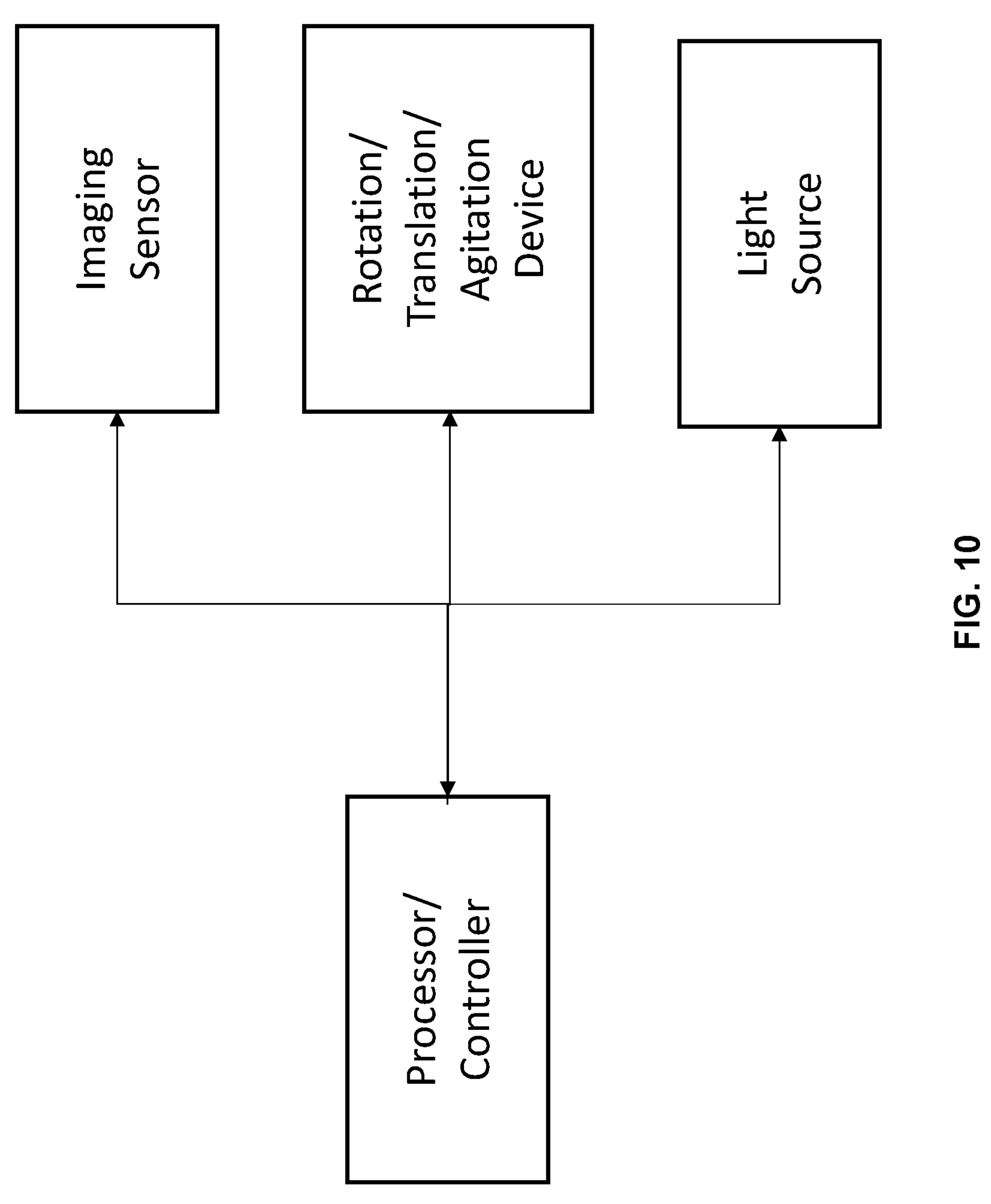
FIG. 10 illustrates a block diagram of various components that can be used to control the operations of a microscopy system in accordance with some example embodiments.

FIG. 10 illustrates a block diagram of various components that can be used to control the operations of a microscopy system in accordance with some example embodiments. In particular, a processer/controller is configured to communicate with translation/rotation/agitation device(s), an imaging sensor and a light source. The translation/rotation/agitation device(s) are coupled to the diffuser(s), waveguide(s), fiber(s), and the like, and are controlled by the processor/controller to control their movement (e.g., translation, rotation, etc.) as a function of time. The processor/controller can further include, or be couple to, a memory that stores processor executable code that causes the processor/controller to generate and transmit/receive suitable information to/from the various system components, as well as suitable input/output (IO) capabilities (e.g., wired or wireless) to transmit and receive commands and/or data with to and from the translation/rotation/agitation devices, the imaging sensor, and the light source. The imaging sensor may be part of a camera and can include a CCD, a CMOS or another light sensing device. The processor/controller may receive the information associated with images captured by the imaging sensor, and further process that information to produce images suitable for display and/or further processing. In some embodiments, the processor/controller may only be in communication with the rotation/translation/agitation device(s), and one or more of the remaining components (e.g., the light source or imaging sensor) may be controlled via separate controllers, or operated manually (e.g., in the case of the light source).

One aspect of the disclosed embodiments relates to a speckle-modulated line illumination device that includes a spatially coherent light source having a speckled output, a collimation lens positioned to receive the output of the spatially coherent light source, a cylindrical lens positioned to receive a collimated light produced by the collimation lens, and a diffuser positioned to receive a focused line illumination from the cylindrical lens, and to impart random phase variations in light that is output therefrom. The diffuser is coupled to a movement stage configured to impart rotational or translational movements to the diffusor as a function of time.

In some example embodiments, the rotational or translational movements cause the output of the diffuser to consist of N different speckle patterns per each predetermined period of time, where N is greater than or equal to 2, and N is selected to improve a speckle characteristic present in the output of the diffuser relative to the output of the spatially coherent light source by a predetermined amount. For example, the speckle characteristic improvement is based on a decrease in noise contrast of images produced using the speckle-modulated line illumination device by 1 divided by the square root of N. In another example embodiment, the diffusor is configured to produce the output light that is transmitted therethrough. In yet another example embodiment, the speckle-modulated line illumination device includes the movement stage that includes one or more translation or a rotation stages physically coupled to the diffuser. In still another example embodiment, the speckle-modulated line illumination device further includes a processor coupled to the movement stage, the processor configured to cause the one or more of a translation or a rotation stages to move.

According to some example embodiments, the speckle-modulated line illumination device is configured as an illumination source in a scattering-based light sheet microscope. In one example embodiment, the speckle-modulated line illumination device is configured as an illumination source in a confocal microscope, and the confocal microscope includes a collimation lens positioned to receive the output light of the speckle-modulated line illumination device, a first grating positioned to receive collimated illumination from the collimation lens, an objective lens positioned to receive spectrally separated light from the first grating and provide spectrally separated line illumination for a sample, where the objective lens positioned to further receive spectrally separated reflected light from the sample. In this example embodiment, the confocal microscope further includes a second grating positioned to receive light that is collected from the sample by the objective lens, a focusing lens positioned to receive light that is output by the second grating, a detection slit positioned at a focal plane of the focusing lens, a second collimating lens positioned to receive light after passing through the detection slit, a third grating positioned to receive collimated light that is provided by the focusing lens, and a second focusing lens positioned to receive spectrally separated light from the third grating and to produced focused light at an image plane, the focused light having different spectral components that are focused at spatially-separated locations at the image plane. In some example embodiments, the above device further includes an imaging sensor positioned at the image plane of the third grating to receive the different spectral components of the focused light and to produce electrical signals associated therewith.

According to some example embodiments, the speckle-modulated line illumination device is configured as an illumination source in a scattering-based light microscope. In one example embodiment, the scattering-based light microscope includes a collimation lens positioned to receive the output light of the speckle-modulated line illumination device, a first objective lens positioned to receive collimated light from the collimation lens and to provide line illumination for a sample, a second objective lens positioned to receive reflected light from the sample, and a second focusing lens positioned to receive light from the second objective lens and to produce focused light at an image plane associated with different spatial locations of the sample. In some example embodiments, the above device further includes an imaging sensor positioned at the image plane of the second focusing lens to receive light associated with different spatial locations of the sample and to produce electrical signals associated therewith.

In one example embodiment, the light source in the speckle-modulated line illumination device is one of a laser diode, or a super luminescent light emitting diode (sLED). In example embodiments, a reduction in speckle noise of the line illumination enables use of a smaller detection slit in a confocal microscope, produces an improved signal-to-noise ratio in images produced by the microscope, or obviates a need to capture multiple images to achieve a desired image quality and image resolution.

Another aspect of the disclosed embodiments relates to a speckle-modulated line illumination device that includes a spatially coherent light source having a speckled output, and an optical waveguide coupled to the spatially coherent light source and coupled to a movement stage configured to impart up, down or sideways agitation to the optical waveguide as a function of time to produce N different speckle patterns per each predetermined period of time at the output of the optical waveguide, wherein N is greater than or equal to 2, and N is selected to improve a speckle characteristic present in the output of the optical waveguide relative to the output of the spatially coherent light source by a predetermined amount.

In some example embodiments, the optical waveguide is a linear optical waveguide having a rectangular cross-sectional area to produce a line illumination output. According to another example embodiment, the optical waveguide is a multimode optical fiber having a circular cross-sectional area at one end that is coupled to the spatially coherent light source, and having a rectangular cross-sectional area at a second end thereof that is configured to produce a rectangular-shaped output of the speckle-modulated line illumination device. In another example embodiment, the optical fiber comprises two sections: a first section having a circular cross-sectional area that extends from the first end to a bottom of the first section, and a second section having an asymmetric tapered profile that extends from the bottom of the first section and extends to the second end.

According to another example embodiment, the optical waveguide is a multimode optical fiber having a circular cross-sectional area, and the speckle-modulated line illumination device includes a collimation lens positioned to receive light that is output from a circular end of the multimode optical fiber, and a cylindrical lens positioned to receive collimated light from the collimation lens and to produce a line illumination output at a focal plane thereof.

Figure 11:
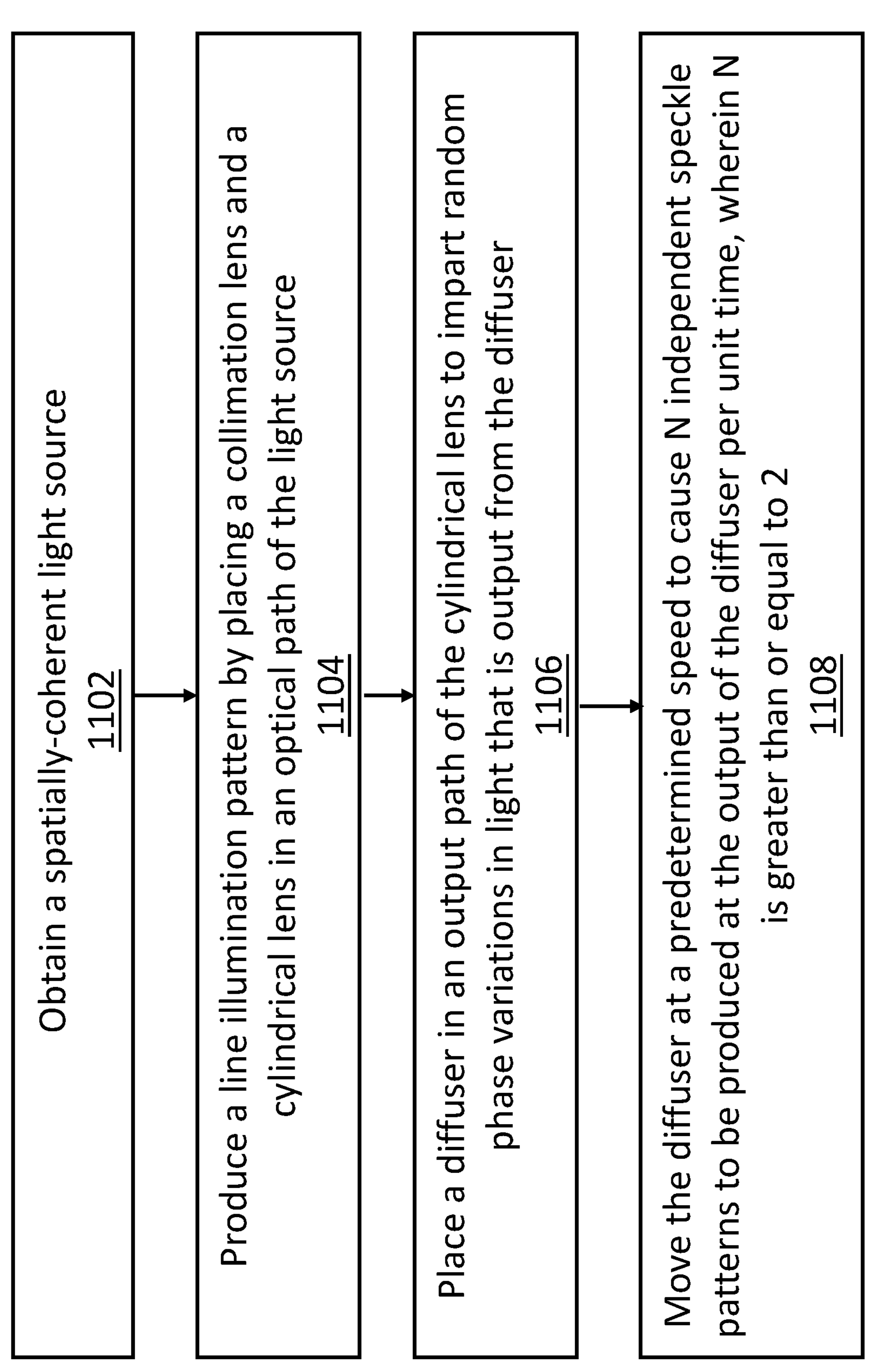
FIG. 11 illustrates a set of operations for reducing a speckle noise in a line illumination device in accordance with an example embodiment.

FIG. 11 illustrates a set of operations for reducing a speckle noise in a line illumination device in accordance with an example embodiment. At 1102, a spatially-coherent light source is obtained. At 1104, a line illumination pattern is produced by placing a collimation lens and a cylindrical lens in an optical path of the light source. At 1106, a diffuser is placed in an output path of the cylindrical lens to impart random phase variations in light that is output from the diffuser, and at 1108, the diffuser is moved at a predetermined speed to cause N independent speckle patterns to be produced at the output of the diffuser per unit time, wherein N is greater than or equal to 2. For example, the diffuser can be located at the focal plane of the cylindrical lens, wherein the beam is collimated along the non-focusing direction of the cylindrical lens.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Only a few implementations and examples are described and other implementations, enhancements and variations can be made based on what is described and illustrated in this patent document.

What is claimed is:

1. A speckle-modulated line illumination device, comprising:

a spatially coherent light source having a speckled output;

a collimation lens positioned to receive the speckled output of the spatially coherent light source;

a converging cylindrical lens positioned to receive a collimated light produced by the collimation lens; and a diffuser positioned at a focal plane of the converging cylindrical lens to receive a focused line illumination from the converging cylindrical lens, and to impart random phase variations in light that is output therefrom, wherein the diffuser is coupled to a movement stage configured to impart rotational or translational movements to the diffuser as a function of time.

2. The speckle-modulated line illumination device of claim 1, wherein:

the rotational or translational movements of the diffuser at a predetermined speed cause an output of the diffuser to consist of N different speckle patterns per each predetermined period of time, where N is greater than or equal to 2, and N is selected to improve a speckle characteristic present in the output of the diffuser relative to the speckled output of the spatially coherent light source by a predetermined amount.

3. The speckle-modulated line illumination device of claim 2, wherein an improvement in the speckle characteristic is based on a decrease in noise contrast of images produced using the speckle-modulated line illumination device by $1/\sqrt{N}$.

4. The speckle-modulated line illumination device of claim 1, wherein the diffuser is configured to produce an output light that is transmitted therethrough.

5. The speckle-modulated line illumination device of claim 1, comprising the movement stage that includes one or more translation or rotation stages physically coupled to the diffuser.

6. The speckle-modulated line illumination device of claim 5, further comprising a processor coupled to the movement stage, the processor configured to cause the one or more translation or rotation stages to move.

7. The speckle-modulated line illumination device of claim 1, configured as an illumination source in a scattering-based light sheet microscope.

8. The speckle-modulated line illumination device of claim 1, configured as an illumination source in a confocal microscope, the confocal microscope comprising:

a collimation lens positioned to receive an output light of the speckle-modulated line illumination device;

a first grating positioned to receive collimated illumination from the collimation lens;

an objective lens positioned to receive spectrally separated light from the first grating and provide spectrally separated line illumination for a sample, the objective lens positioned to further receive spectrally separated reflected light from the sample;

a second grating positioned to receive light that is collected from the sample by the objective lens;

a focusing lens positioned to receive light that is output by the second grating;

a detection slit positioned at a focal plane of the focusing lens;

a second collimating lens positioned to receive light after passing through the detection slit;

a third grating positioned to receive collimated light that is provided by the focusing lens; and a second focusing lens positioned to receive spectrally separated light from the third grating and to produced focused light at an image plane, the focused light having different spectral components that are focused at spatially-separated locations at the image plane.

9. The speckle-modulated line illumination device of claim 8, further comprising an imaging sensor positioned at the image plane of the third grating to receive the different spectral components of the focused light and to produce electrical signals associated therewith.

10. The speckle-modulated line illumination device of claim 1, configured as an illumination source in a scattering-based light microscope, the scattering-based light microscope comprising:

a collimation lens positioned to receive an output light of the speckle-modulated line illumination device;

a first objective lens positioned to receive collimated light from the collimation lens and to provide line illumination for a sample;

a second objective lens positioned to receive reflected light from the sample; and a second focusing lens positioned to receive light from the second objective lens and to produce focused light at an image plane associated with different spatial locations of the sample.

11. The speckle-modulated line illumination device of claim 10, further comprising an imaging sensor positioned at the image plane of the second focusing lens to receive light associated with different spatial locations of the sample and to produce electrical signals associated therewith.

12. The speckle-modulated line illumination device of claim 1, wherein the spatially coherent light source is one of a laser diode, or a super luminescent light emitting diode (sLED).

13. The speckle-modulated line illumination device of claim 1, wherein a reduction in speckle noise of the focused line illumination:

enables use of a smaller detection slit in a confocal microscope, produces an improved signal-to-noise ratio in images produced by the confocal microscope, or obviates a need to capture multiple images to achieve a desired image quality and image resolution.

14. A method for reducing a speckle noise in a line illumination device, comprising:

obtaining a spatially coherent light source;

producing a focused line illumination by placing a collimation lens and a converging cylindrical lens in an optical path of the spatially coherent light source;

placing a diffuser at a focal plane of the converging cylindrical lens in an output path of the converging cylindrical lens to impart random phase variations in light that is output from the diffuser; and moving the diffuser at a predetermined speed to cause N independent speckle patterns to be produced at an output of the diffuser per unit time, wherein N is greater than or equal to 2.

15. The method of claim 14, wherein N is selected to improve a speckle characteristic present in the output of the diffuser relative to a speckled output of the spatially coherent light source by a predetermined amount.

16. The method of claim 15, wherein an improvement in the speckle characteristic is based on a decrease in noise contrast of images produced using the method by $1/\sqrt{N}$.

17. The method of claim 14, wherein the output of the diffuser is configured as an illumination source in a scattering-based light sheet microscope.

18. The method of claim 14, wherein the output of the diffuser is configured as an illumination source in a confocal microscope.

19. The method of claim 14, wherein the spatially coherent light source is one of a laser diode, or a super luminescent light emitting diode (sLED).

20. The method of claim 14, wherein a reduction in speckle noise of the focused line illumination:

enables use of a smaller detection slit in a confocal microscope, produces an improved signal-to-noise ratio in images produced by the confocal microscope, or obviates a need to capture multiple images to achieve a desired image quality and image resolution.

* * * * *